No. 848,327. PATENTED MAR. 26, 1907.
C. THOMAS, Sr.
ADJUSTABLE SAWING MACHINE.
APPLICATION FILED AUG. 4, 1905.
2 SHEETS—SHEET 1.
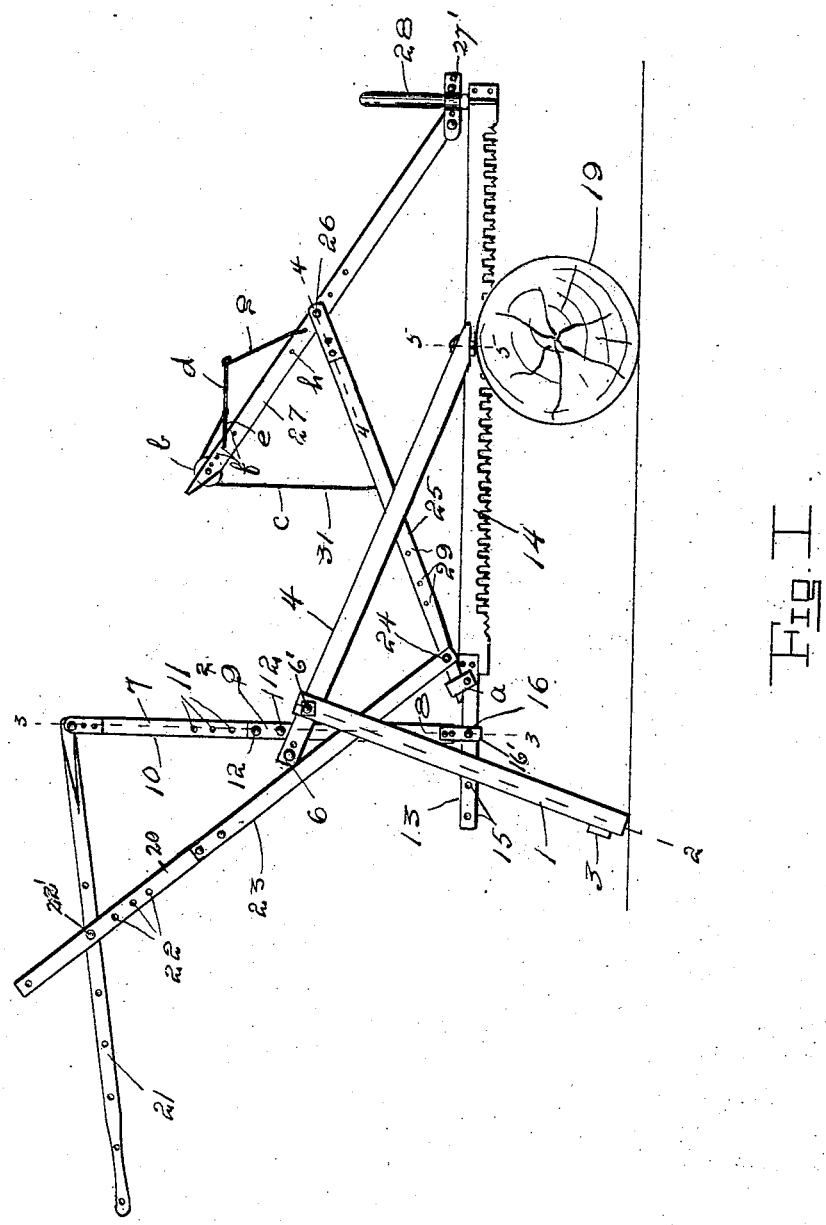

No. 848,327. PATENTED MAR. 26, 1907.
C. THOMAS, Sr.
ADJUSTABLE SAWING MACHINE.
APPLICATION FILED AUG. 4, 1905.
2 SHEETS—SHEET 2.
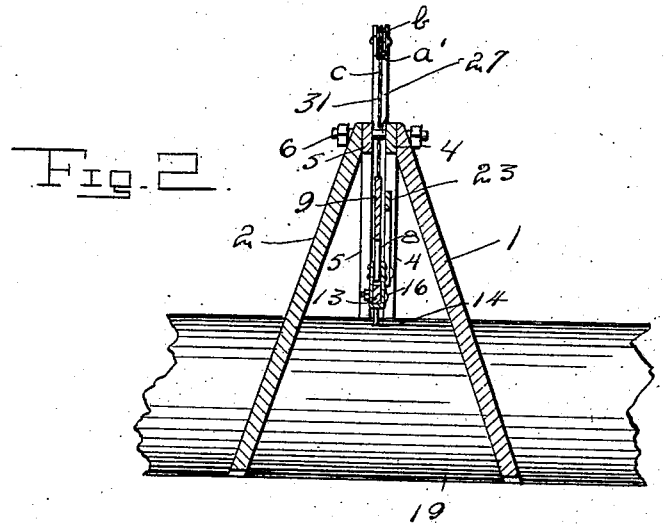
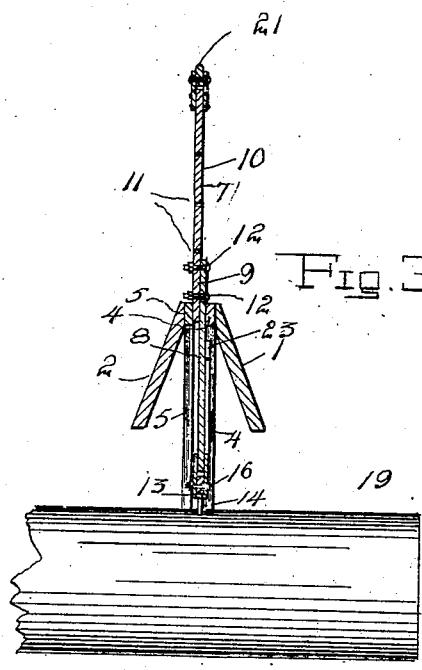
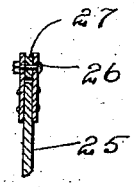
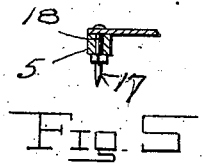
Witnesses
Inventor
C. Thomas. Sr.
Attorneys

UNITED STATES PATENT OFFICE.

CHARLES THOMAS, SR., OF TECUMSEH, OKLAHOMA TERRITORY.

ADJUSTABLE SAWING-MACHINE.

No. 848,327.  Specification of Letters Patent.  Patented March 26, 1907.

Application filed August 4, 1905. Serial No. 272,680.

*To all whom it may concern:*

Be it known that I, CHARLES THOMAS, Sr., a citizen of the United States, residing at Tecumseh, in the county of Pottawatomie, Territory of Oklahoma, have invented certain new and useful Improvements in Adjustable Sawing-Machines; and I do hereby declare the following to be a full, clear, and exact description of the invention, such as will enable others skilled in the art to which it appertains to make and use the same.

This invention relates to drag-saw machines, and has for its object to provide a machine of this character which may be adjusted to suit varying conditions.

A further object of the invention is to provide efficient means for bracing the drag-saw to prevent bending of the same.

With these and other objects in view the invention consists in the construction and arrangement of parts shown in the accompanying drawings, in which—

Figure 1 is a side elevation of my machine, showing the same in use. Fig. 2 is a vertical sectional view through the same on the line 2 2 of Fig. 1. Fig. 3 is a similar view on the line 3 3 of Fig. 1; and Figs. 4 and 5 are sectional views on the lines 4 4 and 5 5, respectively, of Fig. 1.

Referring to the drawings, the numerals 1 and 2 denote the supporting-standards of my machine, which are converged upwardly and are connected at their lower ends by means of a cross-piece 3. The extreme upper ends of the supporting-standards 1 and 2 are spaced from each other, and between the same are engaged the upper end portions of log-engaging legs 4 and 5. These legs 4 and 5 are connected at their extreme upper ends by means of a bolt 6 and are spaced from each other throughout their entire length. A bolt 6' is engaged through the upper ends of the supporting-standards 1 and 2, and through the log-engaging legs 4 and 5 and between the said legs and the bolts 6 and 6' is loosely engaged an oscillating bar 7. This bar consists of a lower member 8, which is connected at its upper end to the lower end of an upper member 10, as at 9. The upper member 10 is provided with a series of openings 11, through which bolts 12, carried by the lower member 8, may be engaged to adjust the two members with relation to each other. For a purpose to be hereinafter described the oscillated bar 7, being loosely confined as stated, between the upper and rear ends of the log-engaging legs 4 and 5 and the bolts 6 and 6', has a vertical feed, and consequently has a variable fulcrum, the purpose of which will be presently specifically stated.

The drag-saw 14 is provided at one of its ends with a bar 13, in which is formed a series of holes 15. A bolt 16, engaged through a yoke 16', which is carried by the lower end of the lower member 8 and which is loosely engaged with the bar 13, is adapted to be interchangeably engaged with the openings 15 in the said bar.

Through the extreme lower ends of the log-engaging legs 4 and 5 is engaged a bolt 18, which is provided with a spur or pointed end 17, which is adapted to be engaged with a log 19.

To a bar 20 is fulcrumed a lever 21, which is pivotally connected at its outer end to the extreme upper end of the oscillating bar 7. This lever is provided with a series of openings, and the bar 20 is provided with a series of openings 22, and interchangeably engaged through these openings is a bolt 22'. The bar 20 includes a lower portion 23, which is pivoted, as at 24, to a truss-bar 25. The truss-bar 25 has its lower end engaged in a yoke a, carried by the bar 13, and is pivoted, by means of a bolt 26 at its upper end, to a second truss-bar 27, the said bolt being interchangeably engaged through a series of openings in the last-named bar. The truss-bar 27 is pivotally clamped, as at 27', to a handle 28 at the end of the saw opposite to the bar 13. A series of openings 29 is provided in the bar 25, through which may be interchangeably engaged the bolt 24.

In order to brace the truss-bars to hold the saw 14 rigid, I provide a tightening device which comprises a rod $d$ and cord $g$, which are connected at one of their ends. The other end of the rod $d$ is bifurcated to permit the engagement of the said end interchangeably with openings $f$, formed in the truss-bar 27, and the cord $g$ is also engaged through openings $h$ in the said bar. Connected to the bar $e$ in any suitable manner is one end of a cable or other flexible connection $c$, which extends over a sheave $b$, rotatably mounted in the upper end of the truss-bar 27. The other end of the cable $c$ is connected in any suitable manner to the truss-bar 25, and it will be readily seen that by moving the end of the cord $g$ away from the bifurcated end of the rod $d$ the truss-bars will be securely braced.

It is obvious that by pressing downwardly and forwardly upon the lever 21 the bar 7 will be oscillated to reciprocate the saw 14, and as this bar is only loosely confined, as heretofore stated, and has a variable fulcrum, the saw will have a downward feed as it cuts through the log, and the fulcrum for the bar 7 will vary approaching the upper end of the bar. It will be understood, of course, that while the bar 7 is sufficiently loosely confined to permit of its downward feed the bolts 6 and 6' are so spaced that there will be little or no lost motion of the bar between them.

What is claimed is—

1. A device of the character described, comprising a frame, a saw, means for reciprocating said saw, truss-bars associated with said saw and means for bracing said bars.

2. A device of the character described, comprising a frame, a saw, truss-bars connected to the ends of said saw and to each other, and means for bracing said bars.

3. A device of the character described, comprising a frame, a saw, truss-bars connected to the ends of said saw and to each other, a rod carried by one of said truss-bars, a connection between said rod and the other of said truss-bars, and means for moving said rod to brace the said truss-bars.

4. A device of the character described, comprising a frame, a saw, truss-bars connected to the ends of said saw and to each other, a rod carried by one of said truss-bars, a connection between said rod and the other of said truss-bars, and a second rod connected to the first-named rod and to the first-named truss-bar adjustably to hold said first-named rod in position to brace the said truss-bar.

In testimony whereof I affix my signature in presence of two witnesses.

C. THOMAS, Sr.

Witnesses:
M. H. TENNISON,
C. G. CALDWELL.